(12) United States Patent  
Miller et al.

(10) Patent No.: US 9,335,169 B2  
(45) Date of Patent: *May 10, 2016

(54) STUD MAPPING AND LAYOUT METHOD

(71) Applicant: Trimble Navigation Limited, Sunnyvale, CA (US)

(72) Inventors: Robert Michael Miller, Commerce City, CO (US); James M. McCartney, Westminster, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/546,712

(22) Filed: Nov. 18, 2014

(65) Prior Publication Data

US 2015/0062556 A1 Mar. 5, 2015

Related U.S. Application Data

(63) Continuation of application No. 13/784,992, filed on Mar. 5, 2013.

(51) Int. Cl.  
*G01C 15/02* (2006.01)  
*G01C 15/00* (2006.01)  
*G01C 3/08* (2006.01)

(52) U.S. Cl.  
CPC .............. *G01C 15/002* (2013.01); *G01C 3/08* (2013.01)

(58) Field of Classification Search  
CPC ............... G01V 3/15; G01J 1/00; G01C 3/08  
USPC .............................................. 356/3.01–28.5  
See application file for complete search history.

(56) References Cited

U.S. PATENT DOCUMENTS

| 7,237,341 B2 | 7/2007 | Murray |
| 8,031,332 B2 | 10/2011 | Miller et al. |
| 8,760,145 B2 | 6/2014 | Tutton et al. |
| 8,922,758 B2 | 12/2014 | McCartney et al. |
| 2005/0078303 A1 | 4/2005 | Murray |
| 2012/0105870 A1 | 5/2012 | Miller et al. |
| 2012/0136475 A1 | 5/2012 | Kahle |
| 2013/0010287 A1* | 1/2013 | Tutton et al. .................. 356/213 |

* cited by examiner

*Primary Examiner* — Luke Ratcliffe  
(74) *Attorney, Agent, or Firm* — Kilpatrick Townsend & Stockton LLP

(57) ABSTRACT

In a method of establishing the location of a pair construction points for a stud in a building, the points are defined by x and y coordinates. A beam of laser light is used to determine a z coordinate of each of the pair of construction points on surfaces of the building. The construction points are established by directing a beam of laser light toward defined x and y coordinate locations and establishing the z coordinate location of the construction points on building surfaces that have the defined x and y coordinates.

18 Claims, 10 Drawing Sheets

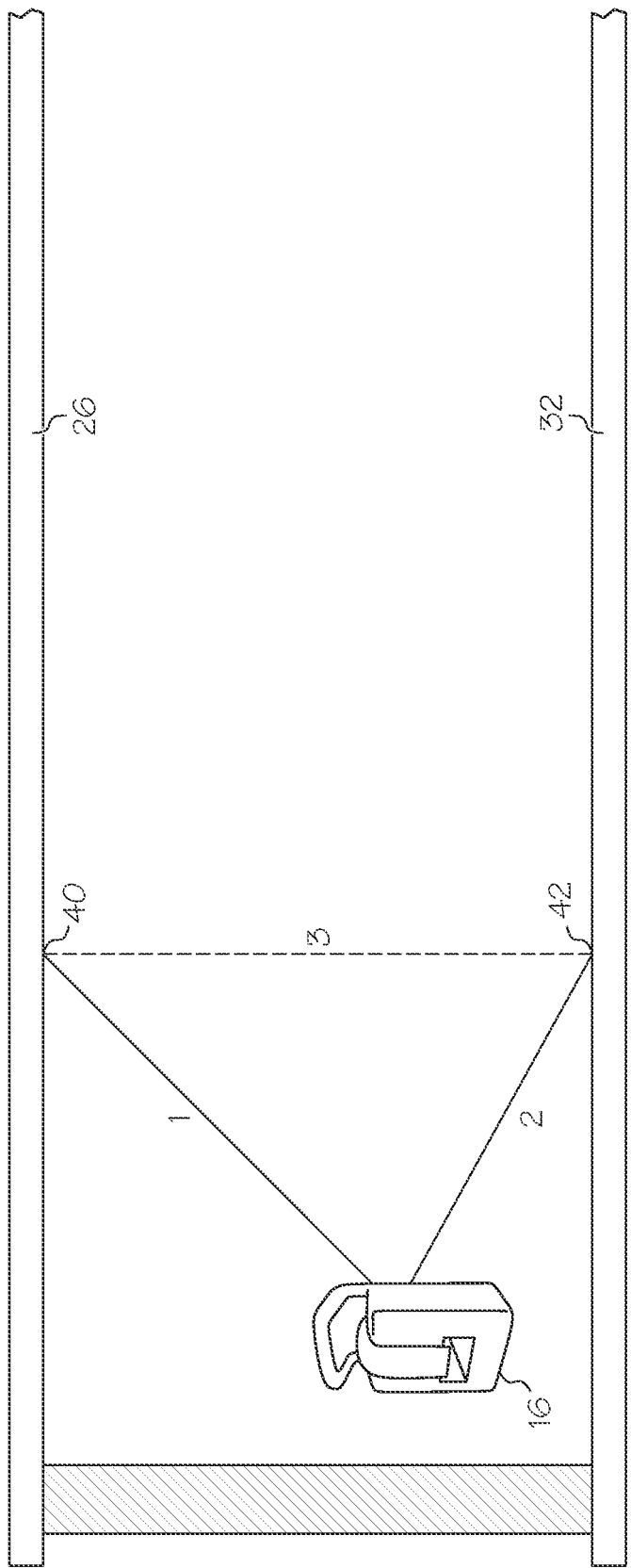

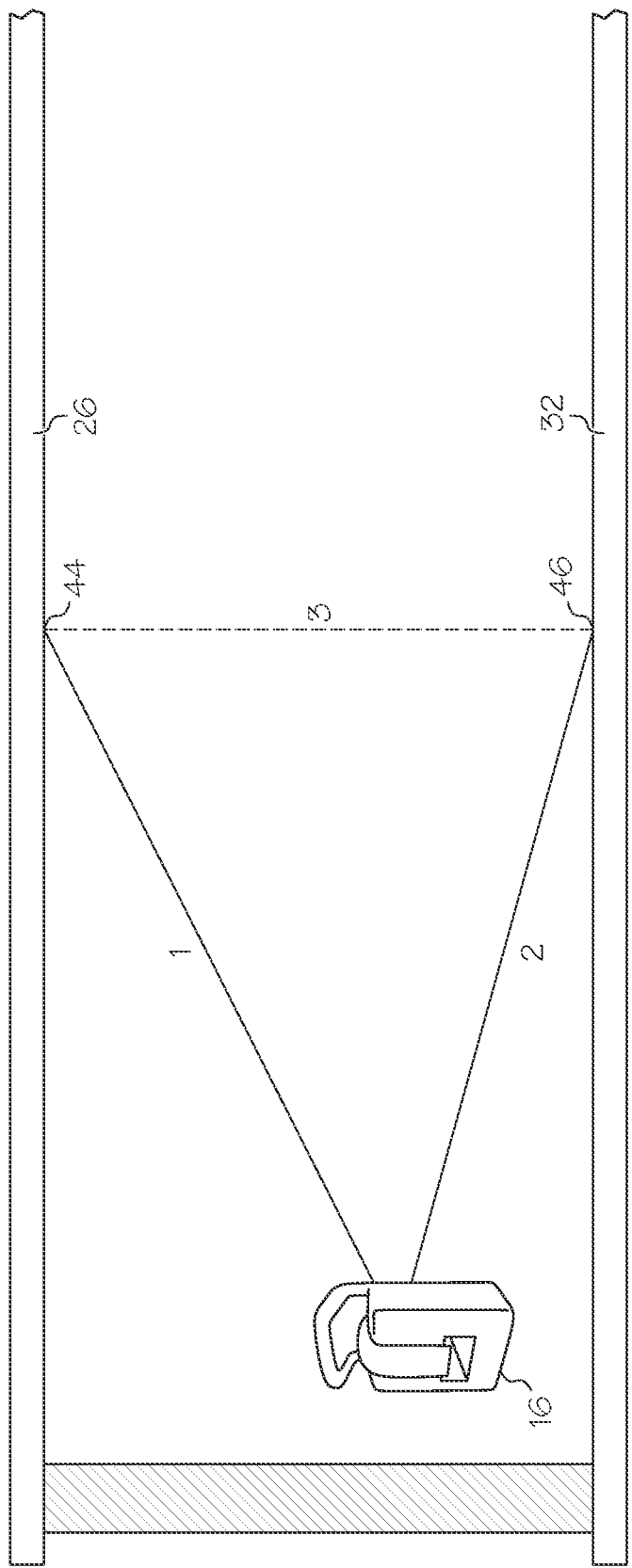

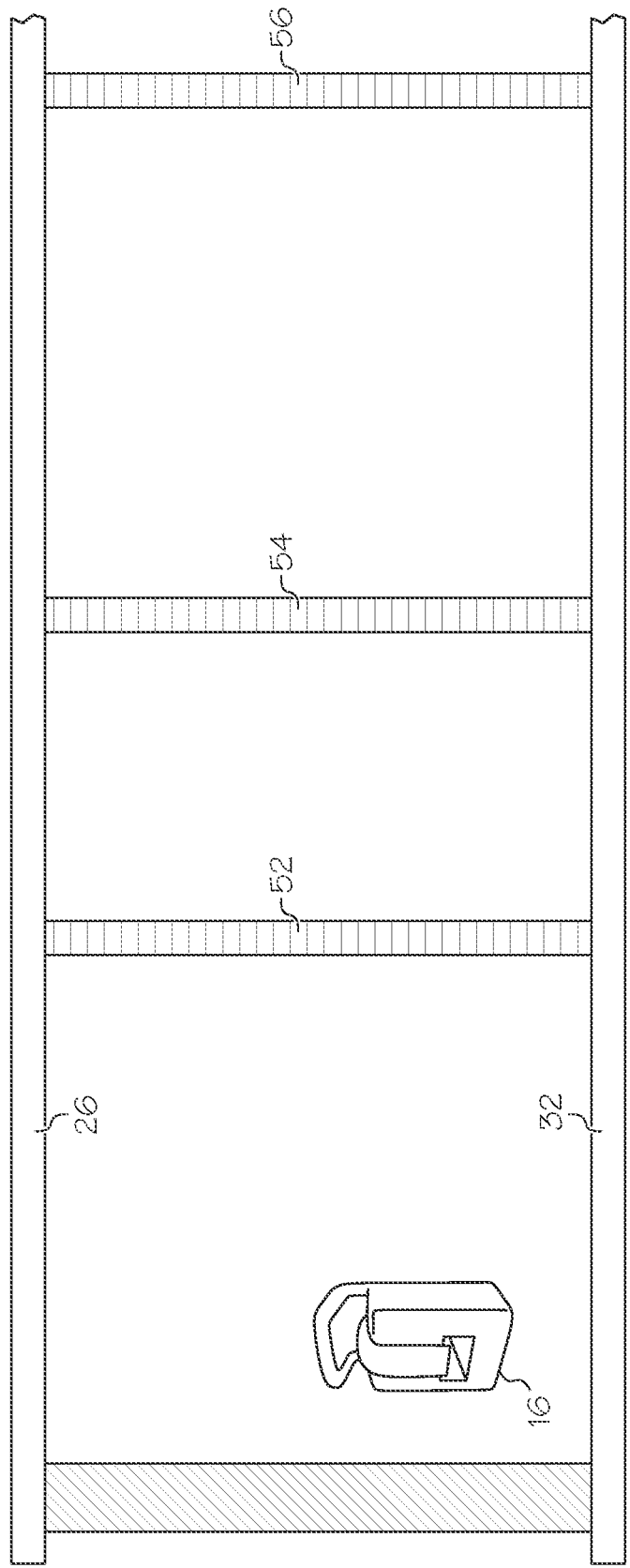

STUD MAPPING AND LAYOUT METHOD

CROSS-REFERENCE TO RELATED U.S. APPLICATIONS—CONTINUATION

This application is a continuation application of and claims priority to and benefit of co-pending U.S. patent application Ser. No. 13/784,992 filed on Mar. 5, 2013, entitled "Stud Mapping and Layout Method," by Robert Michael Miller et al., and assigned to the assignee of the present application.

STATEMENT REGARDING FEDERALLY SPONSORED RESEARCH OR DEVELOPMENT

Not applicable.

BACKGROUND

Laying out walls and wall support structures, including studs, top and bottom plates, and upper and lower tracks, in new buildings under construction, or in existing buildings undergoing renovations or additions, is tedious, time consuming, and expensive. Typically, it has required a significant amount of labor to lay out the construction points at construction sites, including the locations of wood or metal framing elements. Buildings under construction or renovation have floors, ceilings and walls that are not positioned precisely as dimensioned. As an example, the actual elevations of floors and ceilings will vary somewhat from anticipated elevations and will also vary somewhat from location to location. As a consequence, it is necessary to take these variations into account when laying out a building. It has been necessary to measure manually the length for each stud in all of the walls of the building. This process has required teams of workers, with much of the work being accomplished manually, and has been subject to errors. Further, building designs and requirements have become more complex, and construction schedules have become tighter, adding to the need to facilitate and simplify the stud layout process.

SUMMARY OF THE INVENTION

A method of establishing the location of a pair construction points for a stud in a building interior at a construction site and for determining the length of the stud needed to extend between the pair of construction points, where the points are defined by x and y coordinates, includes the steps of generating a beam of laser light, directing the beam of laser light toward a first of the construction points, and determining the distance from the source of the laser light to a point on the actual building surface which is illuminated by the beam. If the distance from the source of the laser light to the point on the actual building surface is greater or less than anticipated, an updated construction point is determined, and the beam is directed at the updated construction point. Finally, the distance to the illuminated point on the actual building surface is determined. This process is repeated until the distance from the source of the laser light to the point on the actual building structure is substantially equal to that anticipated. A first point on the actual building surface having the x and y coordinates is established by this process. The beam of laser light is directed toward the second of the construction points, and this process is repeated to establish a second point having the same x and y coordinates. The vertical distance between the first and second points is then determined, whereby the difference in the z coordinates defines the length of the stud needed to extend between the selected pair of construction points.

The pair of construction points may be selected with a handheld device. Construction data may have been inputted into the handheld device. Such construction data may include a plurality of pairs of construction points at the construction site, with each pair defining the x and y coordinates and the anticipated z coordinates of the ends of a stud. The points established may include a ceiling surface above the source of the laser light, a floor surface below the source of the laser light, a top plate above the source of the laser light, a bottom plate below the source of the laser light, an upper track above the source of the laser light, or a lower track below the source of the laser light.

BRIEF DESCRIPTION OF THE DRAWINGS

FIGS. 6A, 6B, and 6C illustrate establishing three pairs of construction points on a top plate and a bottom plate;

FIG. 7 shows the top plate, the bottom plate, and studs installed at the three pairs of construction points.

DETAILED DESCRIPTION

The described embodiments may be advantageously used in establishing the location of construction points at an indoor construction site and, more particularly, in establishing the location of construction points for studs in a building interior at a construction site. These methods may also determine the lengths of the studs needed to extend between the pairs of construction points. As an example, during the construction of a building, contractors must locate and install studs that will provide interior support for walls and other structures.

The contractor is typically given a blueprint of the layout of each floor in the building, providing the locations of the walls, and the studs for the supports within the walls. The studs may extend vertically between the ceiling and the floor but, more commonly, the studs extend vertically between a bottom plate or lower track, secured to the floor, and a top plate or upper track, secured to the ceiling. Typically, metal tracks are used with metal studs and wooden top and bottom plates are used with wood studs. The contractor must determine the construction points on the floor, ceiling, plates or tracks that define the ends of the studs, mark these points and then measure the vertical distance between them so as to enable studs of appropriate lengths to be cut. It will be appreciated that having workers manually determine the locations of the pairs of construction points, and manually measurement the vertical spacing between the upper and lower construction points in each pair is very time consuming and inefficient, especially when a large building or building complex, such as a shopping mall, is being laid out for construction. Such a construction project may have thousands of studs and associated construction points that must be measured and marked.

The present embodiments provide a way of establishing the locations of a series of construction points at an indoor construction site much more quickly. It will be appreciated that such a construction point is defined by x and y coordinates and an anticipated z coordinate on a generally horizontal building surface, such as a ceiling or a floor that has previously been constructed, or on the top plate or upper track that has previously been secured to the ceiling, or on the bottom plate or lower track that has previously been secured to the floor. The construction points are established on the actual building surfaces by illuminating points on those surfaces that have the x and y coordinates, and generally the anticipated z coordinate.

Figure 1:
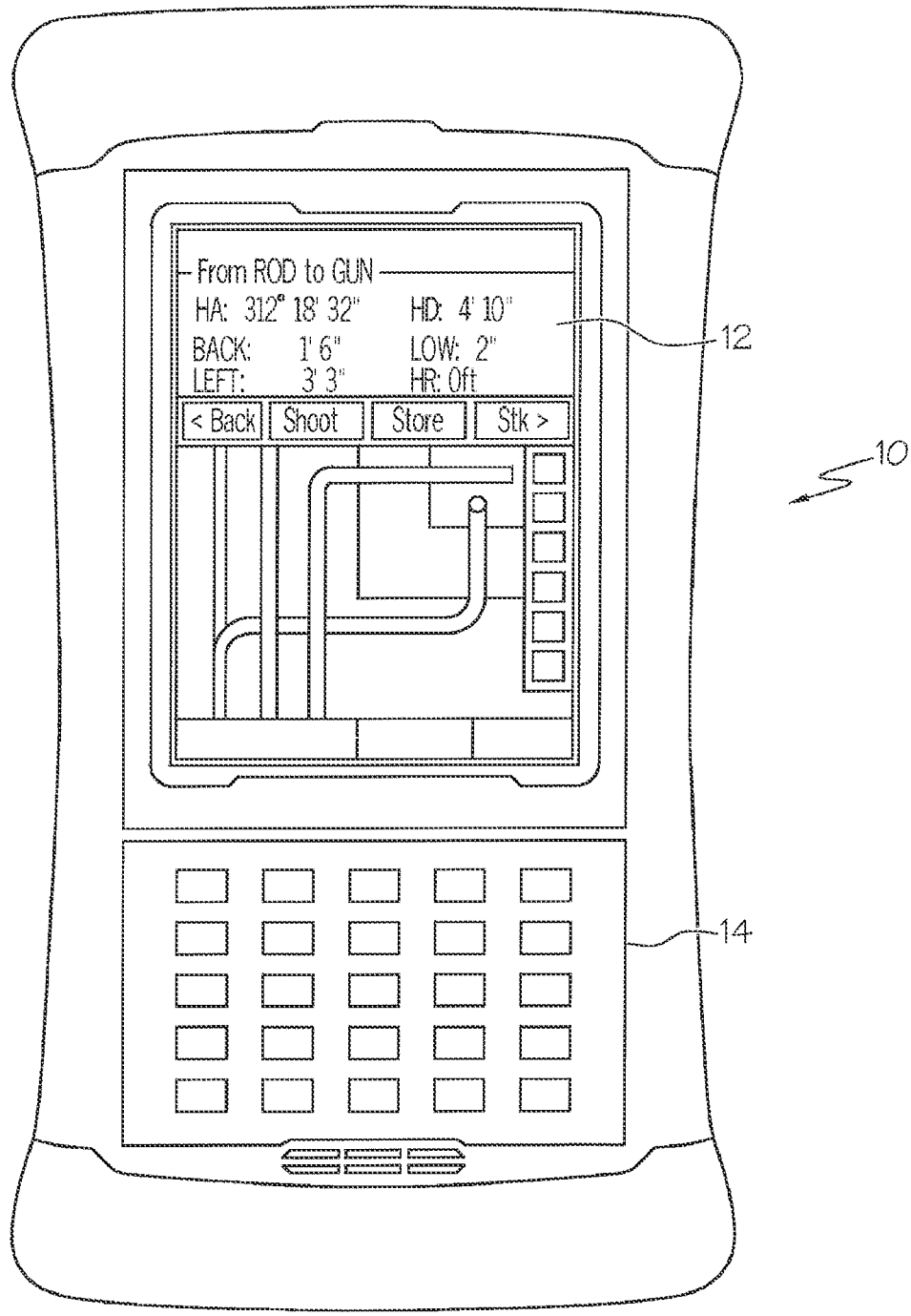
FIG. 1 is a plan view of a handheld device of the type that may be used in practicing the methods.

As seen in FIG. 1, construction data, defining a plurality of construction points at the construction site, including the construction points for the studs, as well as for other construction features, is inputted into the handheld device 10 and displayed on a display 12. The handheld device 10 includes a keyboard 14, a processor, a memory, and a battery power source. Additionally, the handheld device 10 includes wireless communication capabilities, such as Wi-Fi, Bluetooth, radio, and cellular circuits which permit communication with a robotic total station 16, shown in FIGS. 2 and 3, and also with a remote location, such as a contractor's business office located miles from the construction site. The construction plans may be downloaded directly into the handheld device 10 from a computer through a USB port. Alternatively, the construction data may be received wirelessly at the construction site from a remote location, such as a contractor's office. The construction data may be received via e-mail at the construction site from the remote location.

When a location of one of a series of construction points at an indoor construction site is to be established, the operator first must precisely position the robotic total station 16 at the indoor construction site at a known point in relation to the point coordinates of the construction points. To locate the position of the robotic total station 16, any of several approaches may be taken. The position of the robotic total station may be determined by manual measurement of its position with respect to known reference points, e.g. exterior walls, corners, support posts, or other features, in the building. Alternatively, the measurement capabilities of the robot total station 16 may be used to determine the relative position of the total station from such reference points. The station 16 may be used to make reflectorless measurements to the reference points, sensing the distances to the reference points and the direction vectors to the reference points. The station may also be used to make such measurements with a retroreflective prism being placed at each of the reference points. The operator then selects one of the plurality of construction points with the handheld device 10. For this purpose, a drawing of the relevant portion of the construction site is displayed on screen 12, and the point selected with keyboard 14, or by means of touch responsive display 12. The operator then transmits data regarding the selected construction point wirelessly from the handheld device 10 to the robotic total station 16. The robotic total station 16 generates a beam of laser light using the robotic total station, and directs the beam of light from the robotic total station 16 to the location of the construction point 20 to provide a visual indication of the location of the construction point. The manner in which this is accomplished is disclosed in U.S. Pat. No. 8,031,332, issued Oct. 4, 2011, the disclosure of which is incorporated by reference herein.

Figure 2:
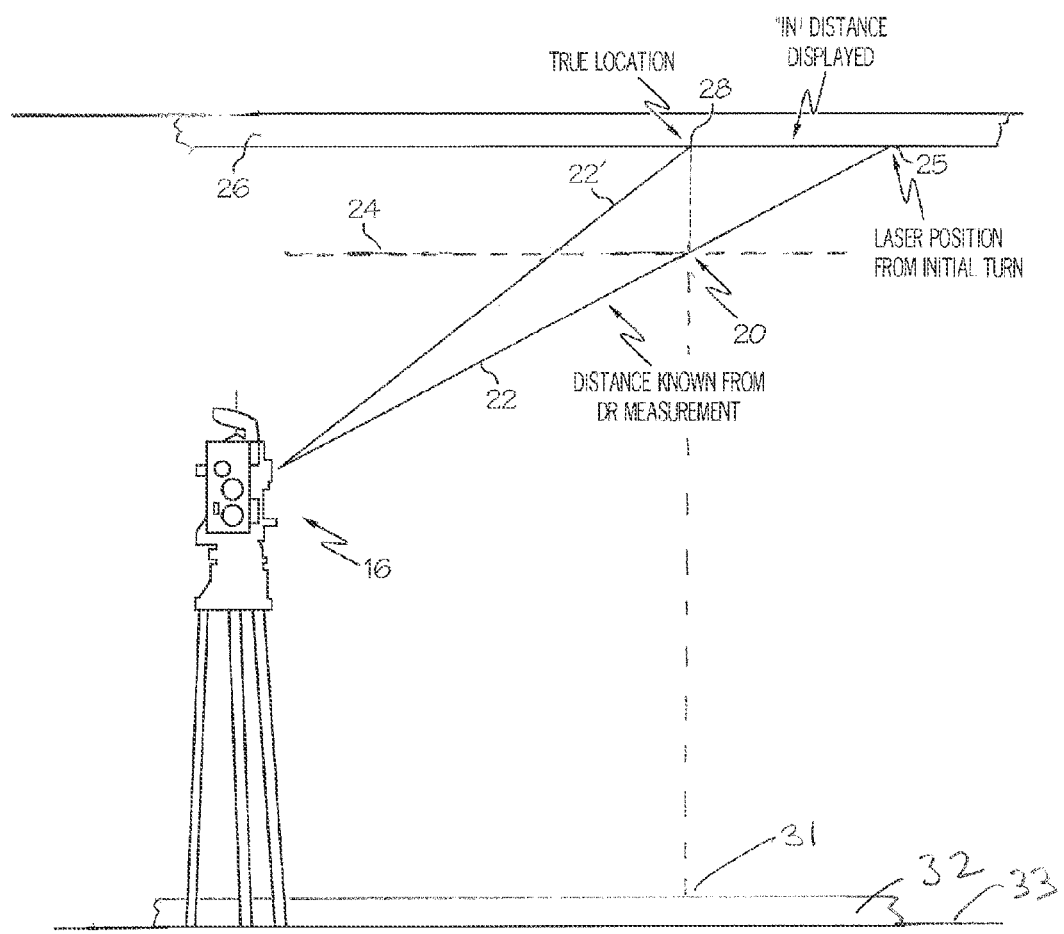
FIG. 2 is a view of a robotic total station, illustrating the method of establishing a construction point at an indoor construction site when the ceiling on which the construction point is to be located is higher than the assumed ceiling height.

As seen in FIG. 2, the direction of the beam 22 is based on the x and y coordinates of the construction point, and an assumed z coordinate, in this case the assumed height of the top plate 26, indicated at 24. Typically, ceiling heights and floor heights will be specified by an architect in a design, but the actual heights of the ceilings and floors may vary significantly from the nominal design elevations. As a result, the beam 22 may illuminate a spot 25 on the actual top plate surface 26 which has x and y coordinates that differ significantly from those of the construction point. To detect this, the robotic total station measures the distance from the robotic total station to the point on the actual building surface which is illuminated by the beam 22. If the distance from the robotic total station 16 to the point on the actual building surface 22 is greater or less than anticipated, the robotic total station trigonometrically determines an updated construction point 28, and then directs the beam at the updated construction point as indicated at 22'. The robotic total station 16 again determines the distance to the illuminated point 28. If this is an anticipated distance, then a point on the actual building surface having the x and y coordinates is established. As will be appreciated, however, constructed ceilings and floors, and plates and tracks secured to those ceilings and floors, are not always perfectly flat. As a result, when the distance to point 28 is measured, if it is not the anticipated distance, a new construction point may need to be determined, and the beam once again redirected. This can be continued iteratively until the distance from the robotic total station to the illuminated point on the actual building structure is substantially equal to that anticipated. If desired, a maximum number of iterations may be set so that the process does not continue if the robotic total station is not able to locate a construction point. For example, the method may be discontinued after three points on the actual building surface have been illuminated without the distance from the robotic total station to the actual building surface being substantially equal to that anticipated.

Figure 3:
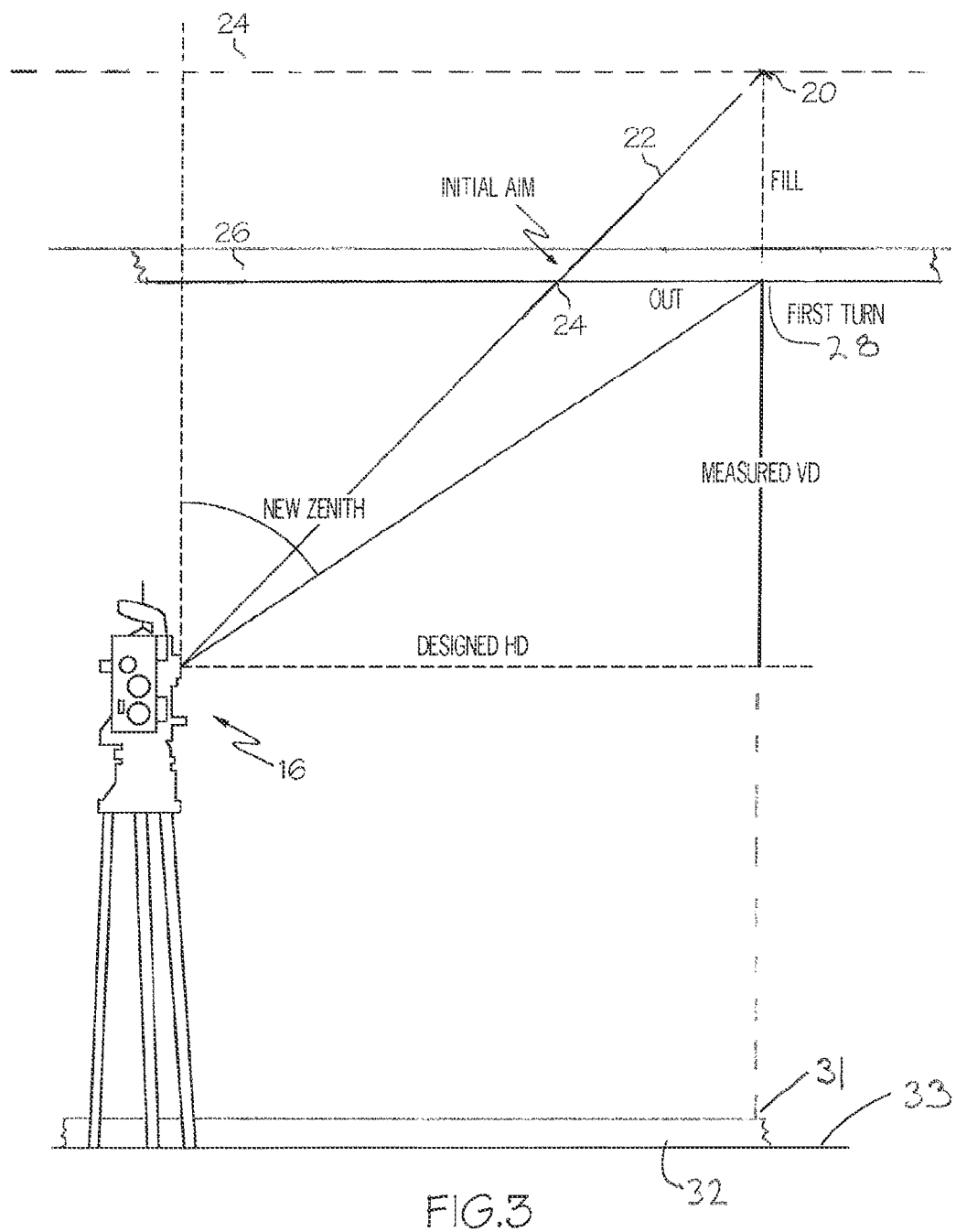
FIG. 3 is a view of a robotic total station, illustrating the method of establishing a construction point at an indoor construction site when the ceiling on which the construction point is to be located is lower than the assumed ceiling height.

FIG. 3 illustrates the instance in which the beam 22 is directed at a construction point 20 having x and y coordinates and an assumed, and erroneous, z elevation for a top plate surface 24 that is too high. As a consequence when the robotic total station attempts to illuminate the point 20, the beam actually strikes point 25 on the top plate 26. The robotic total station then detects a distance to the illuminated point 24 which is less than anticipated. This results in a new construction point 28 being determined and the beam 22' redirected toward it. The distance to the point 28 is measured and, assuming that it equals the anticipated distance, the process ceases with the construction point 28 being established by illumination with beam 22'. If the distance measured is other than that anticipated, as would occur if top plate 26 is not horizontal, then a new updated construction point is determined and the beam redirected toward it. This iterative process continues until a construction point is established or until the iterations are otherwise terminated.

It will be appreciated that the generally horizontal building surface comprises a top plate surface above the robotic total station, as shown in FIGS. 2 and 3, or an upper track surface or a ceiling surface. Additionally, the handheld device 10 and the robotic station 16 are used to lay out a construction point 31 on bottom plate 32 secured to the floor 33, in which the floor 33 may not be totally uniform in elevation. This process proceeds in the same manner as explained above in respect to locating the construction point 31 having the same x and y coordinates as the construction point 28 with which it is paired. The difference in the z coordinates between points 28 and 31 specifies the length of the stud needed to extend vertically between these construction points. The operator will mark the two construction points 28 and 31 with a marker, and record the length of the stud needed for this pair of construction points. This length may be conveyed wirelessly to another worker who cuts a stud of appropriate length, or may simply be used by the worker marking the construction points to cut the stud.

Figure 4A:
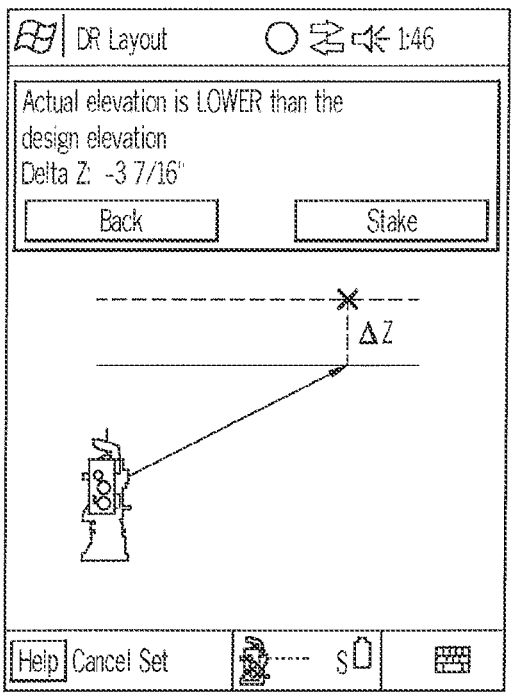
FIG. 4A illustrates the display of the handheld device of FIG. 1 during the process of establishing a construction point at an indoor construction site when the ceiling on which the construction point is to be located is lower than the assumed ceiling height.
Figure 4B:
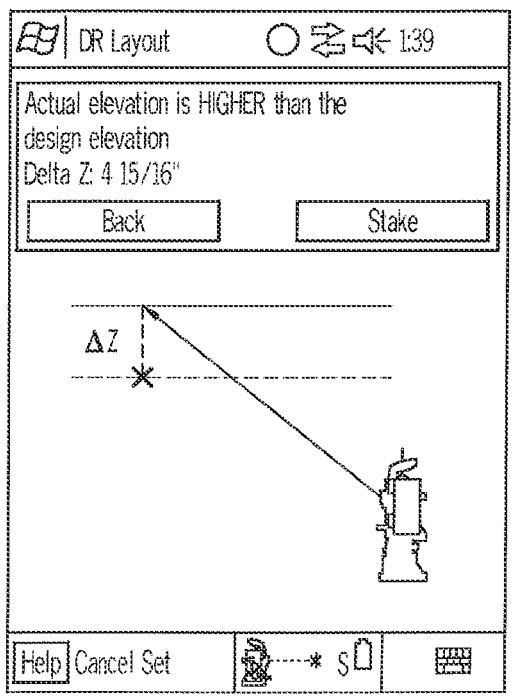
FIG. 4B illustrates the display of the handheld device of FIG. 1 during the process of establishing a construction point at an indoor construction site when the ceiling on which the construction point is to be located is higher than the assumed ceiling height.
Figure 5A:
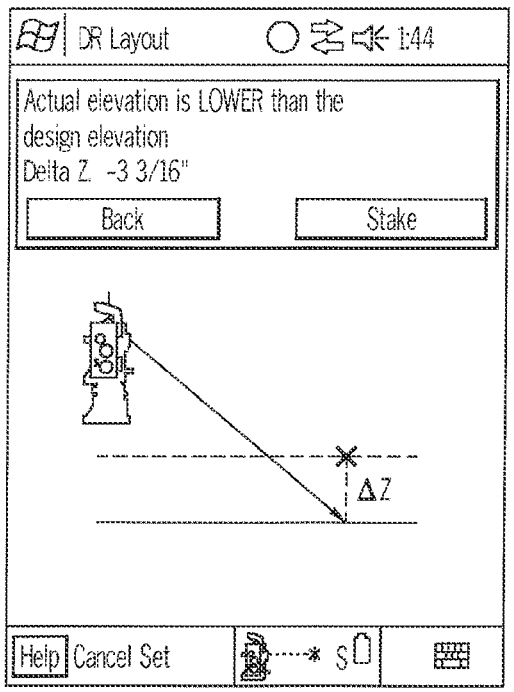
FIG. 5A illustrates the display of the handheld device of FIG. 1 during the process of establishing a construction point at an indoor construction site when the floor on which the construction point is to be located is lower than the assumed floor height.
Figure 5B:
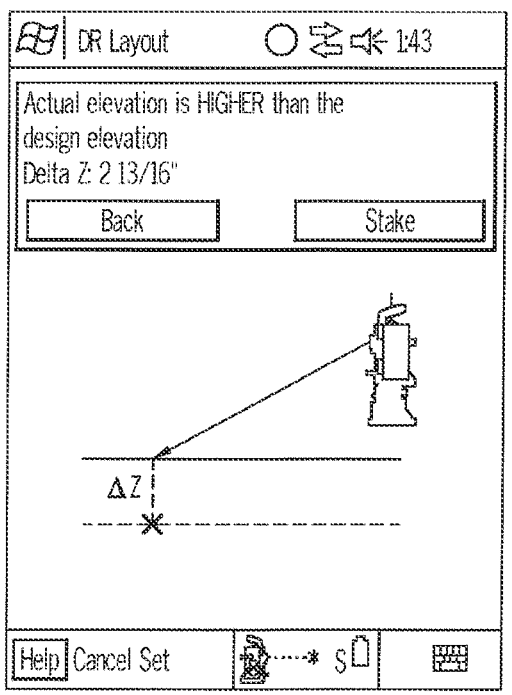
FIG. 5B illustrates the display of the handheld device of FIG. 1 during the process of establishing a construction point at an indoor construction site when the floor on which the construction point is to be located is higher than the assumed floor height.

FIGS. 4A and 4B illustrate the screen display for display 12 for instances where the ceiling, upper track or top plate is lower or higher than the anticipated ceiling height, respectively. Note that the display indicates to the operator how much the anticipated and actual heights differ. Similar screen displays are shown in FIGS. 5A and 5B for instances where the floor elevation, lower track or bottom plate is lower or higher, respectively, than anticipated.

It will be appreciated that the total station 16 and handheld device 10 may be used to update measurements or provide additional construction points. Construction data may be inputted into the handheld device using a retro reflective target that the robotic total station is set to track. The retro reflector is positioned at the construction point to be inputted. The location of the construction point is then measured with the robotic total station by directing a beam of laser light from the total station to the retro reflector. Data is wirelessly transmitted from the robotic total station to the handheld device. The data can then be transmitted wirelessly from the handheld device to a remote location, where it can be used to update the plans for the construction site.

Figure 6C:
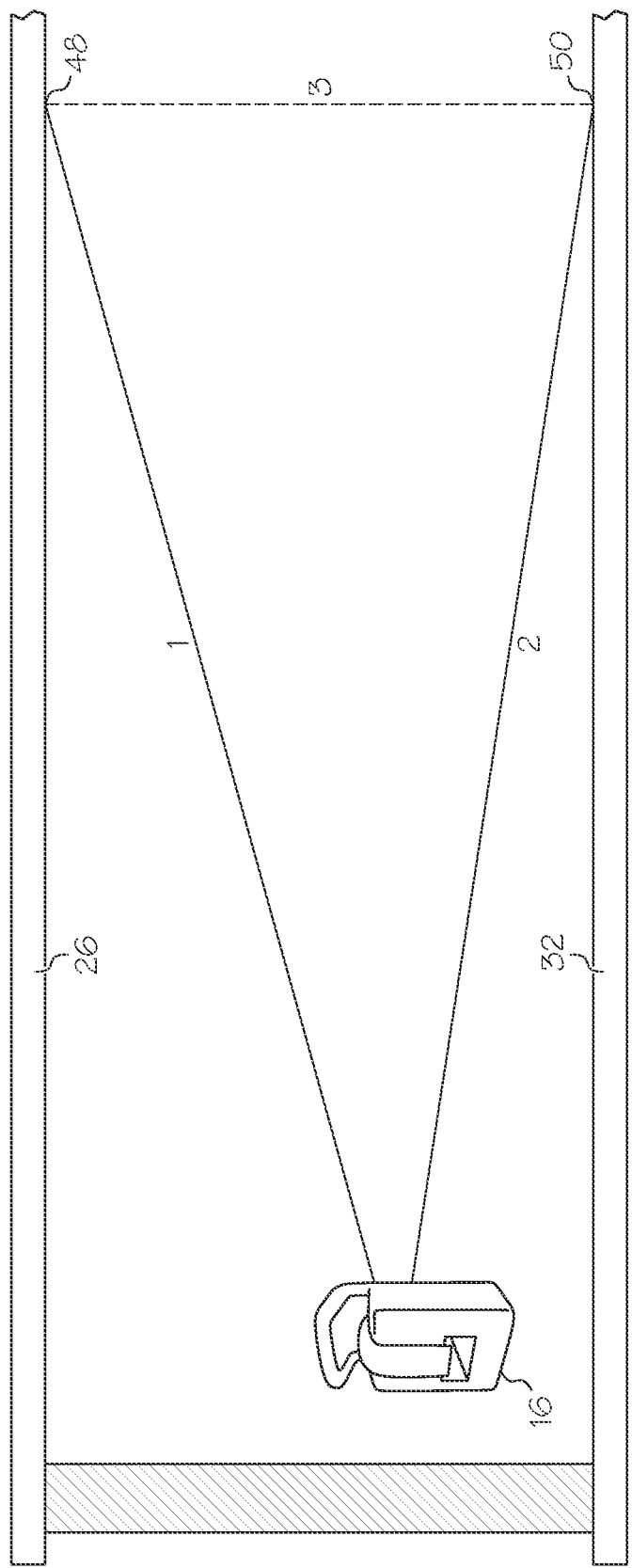

FIGS. 6A, 6B and 6C illustrate the process for laying out a series of stud locations and determining the lengths of the studs needed to extend between pairs of construction points defined by the top plate 26 and the bottom plate 32 at those locations. As shown in FIG. 6A, the robotic total station 16 performs an iterative aiming process, taking measurements to account for any errors in the anticipated elevation in the height of the top plate 26 and locate the construction point 40. The robotic total station 16 performs a similar iterative aiming process, taking measurements to account for any errors in the anticipated elevation in the height of the bottom plate 32 and locate the construction point 42. The vertical distance between the points 40 and 42 is calculated for this pair of construction points, determining the cut length of the wall stud that will be used at this location. The points 40 and 42 will typically be marked on the plates 26 and 32, respectively.

As shown in FIGS. 6B and 6C, this procedure is repeated for each wall stud to be laid out, establishing pairs of construction points 44 and 46, and 48 and 50. As shown in FIG. 7, studs 52, 54, and 56 may then be cut to the needed lengths and installed between the plates 26 and 32 at the marked construction points.

Figure 8:
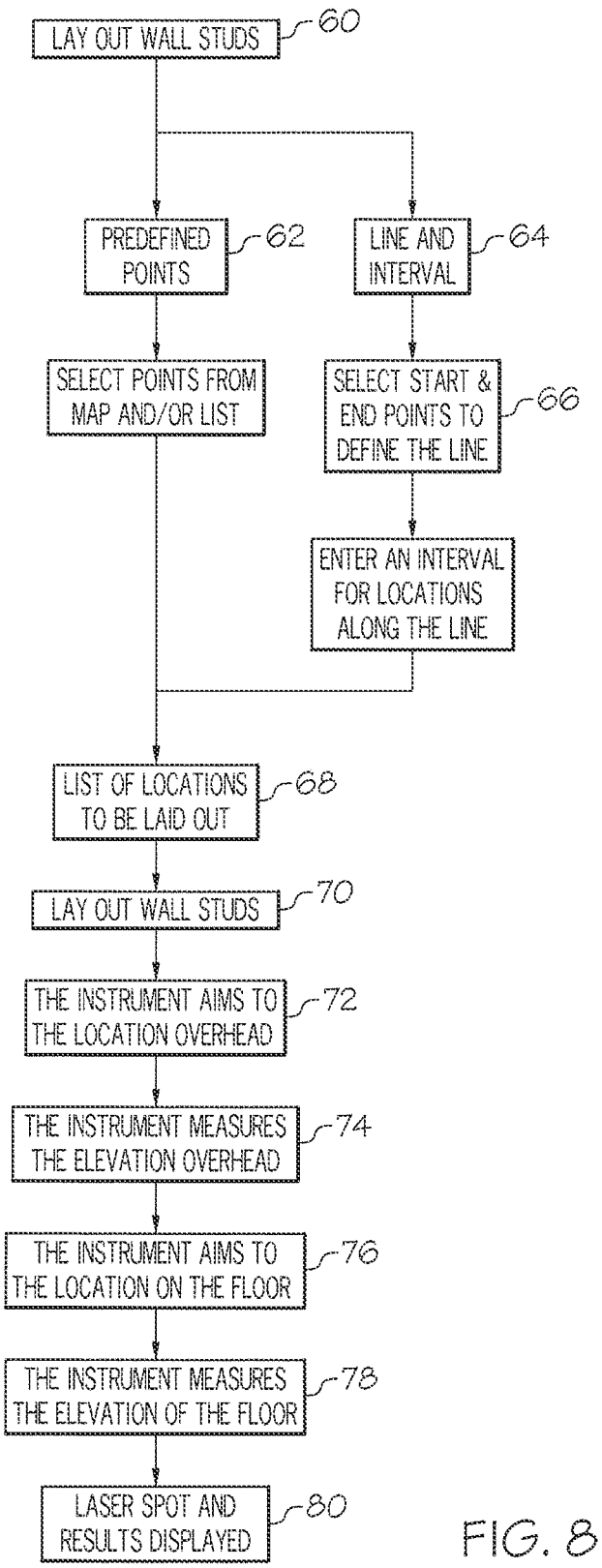
FIG. 8 is a flow chart which is useful in understanding the described methods.

Reference is now made to FIG. 8 which illustrates further aspects of the method. As described previously, the user selects construction points for the studs using the handheld device 10, including keyboard 14 and display 12. The process begins at 60, with the selection of either a series of predetermined points 52 or a line and interval or spacing at 64. The predetermined points may be selected from a map or list of points at 66. The line and interval process 64 is accomplished by the user selecting the start and end points of the line at 66, which may be a line extending the length of the wall to be constructed, and entering the interval or spacing between the studs along the line at 68. Using one of these two processes, the list of locations for the studs which are to be laid out is completed at 68. The system begins the actual lay out process at 70. The user selects one of the locations for a stud and the upper, or overhead location, and lower or floor location are iteratively determined at 72, 74, 76 and 78. The elevation difference between the upper and lower locations defines the length of the stud that is needed to extend between these two locations. The total station then directs a beam of laser light at the two locations and the results are displayed on display 12 at 80. It will be appreciated even though FIG. 8 depicts the upper location being address prior to the lower location, the order in which the locations are determined by the systems, and in which the locations are illuminated by the total station for marking is immaterial. That is, the upper location can be determined and illuminated prior to the lower location, or the lower location can be determined and illuminated prior to the upper location.

Other aspects, objects, and advantages of the embodiments can be obtained from a study of the drawings, the disclosure, and the appended claims.

What is claimed is:

1. A method of establishing locations of a pair construction points for a stud in a building, where said pair of construction points are defined by x and y coordinates, said method comprising:

directing a beam of laser light toward a first construction point of said pair construction points;

determining a distance from a source of said beam of laser light to an illuminated point on a first building surface of said building which is illuminated by said beam of laser light;

responsive to the distance from said source of said beam of laser light to said illuminated point on said first building surface being greater or less than anticipated, repeatedly:

determining an updated location of said first construction point;

directing said beam of laser light at the updated location of said first construction point; and determining a distance to said illuminated point on said first building surface, until the distance from said source of said beam of laser light to said illuminated point on said first building surface is substantially equal to that anticipated, whereby a z coordinate of the location of said first construction point on said first building surface is established;

directing said beam of laser light toward a second construction point of said pair of construction points; and determining a distance from said source of said beam of laser light to an illuminated point on a second building surface of said building which is illuminated by said beam of laser light, whereby a z coordinate of the location of said second construction point on said second building surface is established;

wherein said determining a distance from said source of said beam of laser light to an illuminated point on a second building surface of said building which is illuminated by said beam of laser light, whereby a z coordinate of the location of said second construction point on said second building surface is established further comprises:

responsive to the distance from said source of said beam of laser light to said illuminated point on said second building surface being greater or less than anticipated, repeatedly:

determining an updated location of said second construction point;

directing said beam of laser light at the updated location of said second construction point; and determining the distance to said illuminated point on said second building surface, until the distance from said source of said beam of laser light to said illuminated point on said second building surface is substantially equal to that anticipated, whereby a z coordinate of the location of said second construction point on said second building surface is established.

2. The method as recited in claim 1, further comprising: determining a vertical distance between the location of said first construction point and the location of said second construction point, whereby said vertical distance defines a length of said stud needed to extend between said pair construction points.

3. The method as recited in claim 1, further comprising: illuminating said first construction point and second construction point with said laser light.

4. The method as recited in claim 1, wherein one construction point of said pair of construction points is established on a ceiling surface above said source of said beam of laser light.

5. The method as recited in claim 1, wherein one construction point of said pair of construction points is established on a floor surface below said source of said beam of laser light.

6. The method as recited in claim 1, wherein one construction point of said pair of construction points is established on a top plate above said source of said beam of laser light.

7. The method as recited in claim 1, wherein one construction point of said pair of construction points is established on a bottom plate below said source of said beam of laser light.

8. The method as recited in claim 1, wherein one construction point of said pair of construction points is established on an upper track above said source of said beam of laser light.

9. The method as recited in claim 1, wherein one construction point of said pair of construction points is established on a lower track below said source of said beam of laser light.

10. A method of establishing locations of a pair construction points for a stud in a building, wherein each of said pair of construction points are defined by x and y coordinates and anticipated z coordinates on building surfaces of said building, said method comprising:

receiving input of construction data into a handheld device, said construction data defining a plurality of pairs of construction points in said building, each pair defining x and y coordinates and anticipated z coordinates of opposing ends of a stud location;

receiving a selection of one of said plurality of pairs of construction points with said handheld device;

directing a beam of laser light from a robotic total station toward x and y coordinates and an anticipated z coordinate on a first building surface of said building, wherein said x and y coordinates and said anticipated z coordinate are associated with a first construction point of said selected pair of construction points;

determining a distance from said robotic total station to an illuminated point on said first building surface which is illuminated by said beam of laser light;

responsive to the distance from said robotic total station to said illuminated point on said first building surface being greater or less than anticipated, repeatedly:

determining an updated location of said first construction point;

directing said beam of laser light at the updated location of said first construction point; and determining the distance to said illuminated point on an said first building surface, until the distance from said robotic total station to said illuminated point on said first building surface is substantially equal to that anticipated, whereby a z coordinate of the location of said first construction point on said first building surface is established;

directing said beam of laser light from said robotic total station toward x and y coordinates and an anticipated z coordinate on a second building surface of said building, wherein said x and y coordinates and said anticipated z coordinate are associated with a second construction point of said selected pair of construction points; and determining the distance from said robotic total station to an illuminated point on said building second surface which is illuminated by said beam of laser light, whereby a z coordinate of the location of said second construction point on said second building surface is established;

wherein determining the distance from said robotic total station to an illuminated point on said second building surface which is illuminated by said beam of laser light, whereby a z coordinate of the location of said second construction point on said second building surface is established comprises:

responsive to the distance from said robotic total station to said illuminated point on said second building surface being greater or less than anticipated, repeatedly:

determining an updated location of said second construction point;

directing said beam of laser light at the updated location of said second construction point; and determining the distance to said illuminated point on said second building surface, until the distance from said robotic total station to said illuminated point on said second building surface is substantially equal to that anticipated, whereby said a z coordinate of the location of said second construction point on said second building surface is established.

11. The method as recited in claim 10, further comprising: determining a difference between said established z coordinates of said selected pair of construction points, whereby said difference in said established z coordinates defines a length of said stud needed to extend between said selected pair of construction points at said stud location.

12. The method as recited in claim 10, further comprising: illuminating said first construction point and second construction point with said laser light.

13. The method as recited in claim 10, wherein one of said construction points of said selected pair of construction points is established on a ceiling surface.

14. The method as recited in claim 10, wherein one of said construction points of said selected pair of construction points is established on a floor surface.

15. The method as recited in claim 10, wherein one of said construction points of said selected pair of construction points is established on a top plate.

16. The method as recited in claim 10, wherein one of said construction points of said selected pair of construction points is established on a bottom plate.

17. The method as recited in claim 10, wherein one of said construction points of said selected pair of construction points is established on an upper track.

18. The method as recited in claim 10, wherein one of said construction points of said selected pair of construction points is established on a lower track.

* * * * *